United States Patent
Verhaag et al.

(10) Patent No.: US 10,833,300 B2
(45) Date of Patent: Nov. 10, 2020

(54) BATTERY FOR A HANDHELD MACHINE TOOL AND METHOD FOR PRODUCING A BATTERY FOR A HANDHELD MACHINE TOOL

(71) Applicant: Hilti Aktiengesellschaft, Schaan (LI)

(72) Inventors: Benno Verhaag, Furstenfeldbruck (DE); Bernd Ziegler, Hiltenfingen (DE); Hubert Ludwig, Landsberg am Lech (DE); Michael Brandner, Landsberg am Lech/Erpfting (DE); Klaus Hauser, Schwabmunchen (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 14/801,220

(22) Filed: Jul. 16, 2015

(65) Prior Publication Data
US 2015/0325826 A1   Nov. 12, 2015

Related U.S. Application Data

(63) Continuation of application No. PCT/EP2014/050551, filed on Jan. 14, 2014.

(30) Foreign Application Priority Data

Jan. 16, 2013 (DE) .......... 10 2013 200 546

(51) Int. Cl.
*H01M 2/10* (2006.01)
*H01M 10/658* (2014.01)
(Continued)

(52) U.S. Cl.
CPC .......... *H01M 2/1022* (2013.01); *C09K 21/00* (2013.01); *H01M 2/0267* (2013.01);
(Continued)

(58) Field of Classification Search
CPC .......... C09K 21/00; H01M 10/052; H01M 10/6235; H01M 10/658; H01M 10/659;
(Continued)

(56) References Cited

U.S. PATENT DOCUMENTS

| 6,102,995 A * | 8/2000 | Hutchings .............. C09D 5/185 106/18.15 |
| 2003/0170535 A1 * | 9/2003 | Watanabe ........... H01M 2/0207 429/158 |

(Continued)

FOREIGN PATENT DOCUMENTS

| CN | 101689617 A | 3/2010 |
| EP | 2244318 | 10/2010 |

OTHER PUBLICATIONS

Chinese Office Action, dated Dec. 29, 2016.
(Continued)

*Primary Examiner* — Lingwen R Zeng
(74) *Attorney, Agent, or Firm* — McAndrews, Held & Malloy, Ltd.

(57) ABSTRACT

The battery unit according to the invention for a handheld machine tool comprises a number of battery cells, with at least one of the battery cells being embodied as an isolation battery cell, and showing a fire protection jacket comprising an intumescent material. The fire protection jacket surrounds the isolation battery cell at least partially such that the isolation battery cell is surrounded by the fire protection jacket at a predetermined temperature such that the isolation battery cell is thermally insulated.

18 Claims, 3 Drawing Sheets

(51) Int. Cl.
   *H01M 10/6235*   (2014.01)
   *H01M 2/02*       (2006.01)
   *C09K 21/00*      (2006.01)
   *H01M 10/659*    (2014.01)
   *H01M 10/052*    (2010.01)

(52) U.S. Cl.
   CPC ..... *H01M 2/1094* (2013.01); *H01M 10/6235* (2015.04); *H01M 10/658* (2015.04); *H01M 10/659* (2015.04); *H01M 10/052* (2013.01); *Y10T 29/4911* (2015.01)

(58) Field of Classification Search
   CPC ............. H01M 2/0267; H01M 2/1022; H01M 2/1094; Y10T 29/4911
   See application file for complete search history.

(56) References Cited

U.S. PATENT DOCUMENTS

| | | | |
|---|---|---|---|
| 2005/0170238 A1* | 8/2005 | Abu-Isa | H01M 2/0242 429/82 |
| 2005/0253553 A1* | 11/2005 | Phillips | H01M 2/1022 320/112 |
| 2009/0255619 A1* | 10/2009 | Tong | E04B 1/94 156/71 |
| 2010/0136404 A1 | 6/2010 | Hermann et al. | |
| 2010/0183910 A1* | 7/2010 | Nishino | H01M 10/0431 429/163 |
| 2011/0014514 A1 | 1/2011 | Mehta et al. | |
| 2011/0064997 A1 | 3/2011 | Peskar et al. | |
| 2011/0192564 A1 | 8/2011 | Mommer et al. | |
| 2011/0300431 A1 | 12/2011 | Smith et al. | |
| 2013/0091789 A1* | 4/2013 | Simon | E04B 1/944 52/220.8 |

OTHER PUBLICATIONS

International Search Report in PCT/EP2014/050551 dated Apr. 15, 2014.
Chinese Office Action, dated Feb. 11, 2018.

* cited by examiner

BATTERY FOR A HANDHELD MACHINE TOOL AND METHOD FOR PRODUCING A BATTERY FOR A HANDHELD MACHINE TOOL

RELATED APPLICATIONS

This application claims priority to, and is a continuation of, International Application No. PCT/EP2014/050551 having an International filing date of Jan. 14, 2014, which is incorporated herein by reference, and which claims priority to German Patent Application No. 10 2013 200 546.6, having a filing date of Jan. 16, 2013, which is also incorporated herein by reference in its entirety.

TECHNOLOGY OF THE INVENTION

The present invention relates to a battery for a handheld machine tool and a method for producing a battery for a handheld machine tool.

BACKGROUND OF THE INVENTION

Due to the fact that every battery represents an energy source, which is capable without external influence to provide power, and at which even in the idle state a voltage is given, in case of malfunctions here risks develop for humans and the environment. In case of malfunctions, energy can be released, for example in the form of electric current, voltage, or heat in an unintentional and uncontrolled fashion.

Here, chain reactions may develop as well, in which the adjacent battery cells of one malfunctioning battery cell are heated such that a so-called "thermal runaway" occurs. The "thermal runaway" is an unstoppable chemical process and leads to the destruction of the cells, and here flames may develop.

Primarily in lithium-ion batteries, this chain reaction is promoted by the oxygen content of air, as soon as the electrolyte exiting the cell valve reacts with oxygen. Inside the cell, the formation of dendrites leads to an internal short-circuitry, which results in the boiling point being exceeded. The molten substances are highly reactive and very flammable. Accordingly, an explosive "thermal runaway" can occur quickly.

Such malfunctions should be prevented, to the extent possible, or at least they should be reduced with regards to consequences and risks to the extent possible and humans and the environment should be protected. Some manufacturers of batteries offer safety devices, which for example open a type of safety valves in case of excessive temperatures or currents, in order to release the excessive pressure developing inside the battery cell. However, some risks always remain so that in the worst case scenario an explosion of individual battery cells or even the entire battery unit is possible.

BRIEF SUMMARY OF THE INVENTION

The battery unit according to the invention for a handheld machine tool comprises a number of battery cells, with at least one of the battery cells being embodied as an isolation battery cell, and showing a fire protection jacket comprising an intumescent material. The fire protection jacket surrounds the isolation battery cell at least partially such that the isolation battery cell is surrounded by the fire protection jacket at a predetermined temperature such that the isolation battery cell is thermally insulated.

BRIEF DESCRIPTION OF SEVERAL VIEWS OF THE DRAWINGS

The following description explains the invention based on exemplary embodiments and figures. The figures show.

Identical elements or elements with identical functions are indicated in the figures with the same reference characters, unless stipulated otherwise.

DETAILED DESCRIPTION OF THE INVENTION

Figure 1:
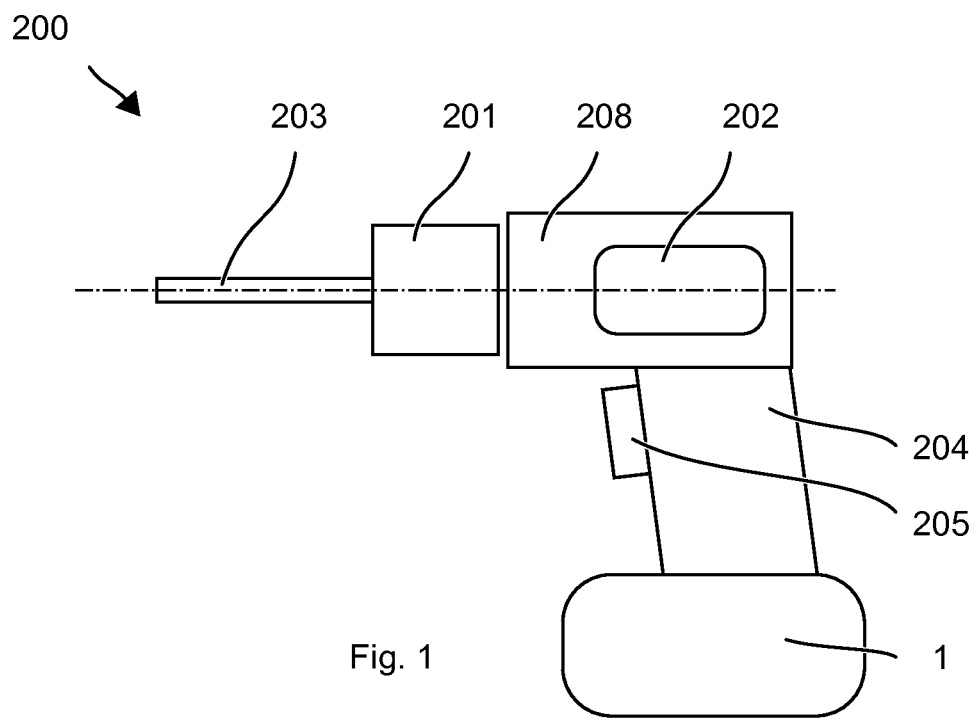
FIG. 1 an electric screwdriver,
FIG. 2 a battery,
FIG. 3 a longitudinal cross-section through the battery,
FIG. 4 a cross-section through the battery,
FIG. 5 a cross-section through the battery,
FIG. 6 a cross-section through a battery unit with eight round battery cells in normal operation,
FIG. 7 a cross-section through a battery unit with eight round battery cells during malfunction,
FIG. 8 a cross-section through a battery unit with twelve flat battery cells in normal operation, and
FIG. 9 a cross-section through a battery unit with twelve flat battery cells during malfunction.

The battery according to the invention for machine tools comprises a number of battery cells, with at least one of the battery cells being embodied as an isolation battery cell. Further, the battery comprises a fire protection jacket, showing an intumescent material, which at least partially enwraps the isolation battery cell such that the isolation battery cell is surrounded by the fire protection jacket at a predetermined temperature such that the isolation battery cell is thermally insulated.

This way, faulty battery cells can be sealed towards the outside. Humans and the environments can be protected from the dissipation of heat, and the safety of the user of machine tools can be increased. In the ideal case, when an error occurs, for example in case of a faulty, hot, or burning battery cell, it can be prevented that excessive heat developing spreads to objects in the proximity and causes damages. Advantageously it can be prevented that the battery begins to burn, or a fire can be extinguished or limited. This form of fire protection can be designed largely independent from cell technology, the design of the individual cells, and the design of the entire battery unit.

The life expectancy of cells and also the life expectancy of the entire battery unit can be extended when the fire protection jacket is designed such that a reduction of vibrations is yielded, which act upon individual cells. This way, the stress upon the battery unit can be reduced and an extended life expectancy of the battery can be achieved.

A battery is a rechargeable storage for electric energy on an electro-chemical basis. Batteries may be combined with each other, for example, in a serial connection to increase the useful electric voltage or in a parallel connection to increase the useful capacity.

A machine tool particularly represents an electric machine tool, for example an electric screwdriver.

The electric screwdriver has a housing with a handle, by which a user can hold and guide the electric screwdriver. A switch at the handle allows the user to start operation of the electric screwdriver. For example, the user can hold down the switch for an extended period of time in order to keep the electric screwdriver in operation.

The battery cell is a cell or an accumulator cell, for example a rechargeable battery or an accumulator. The battery cell is for example a lithium-ion battery or a lithium-polymer battery. The battery cell may also represent a part of a battery pack.

Preferably, a plurality of battery cells is provided in the battery unit.

An intumescing material represents a material which is equipped to enlarge its volume at a predetermined excessive temperature, and for example swell up. Preferably, the intumescent material is flame retardant. The use of a flame retardant material allows the possibility to extinguish (a fire) in the proximity of the battery cell, which battery cell or accumulator may show more than one battery cell. Beneficially, in case of the development of strong heat, which exceeds the normal operating temperature, a chemical reaction occurs, which prevents that any flames can exit and/or any major heat can develop. Advantages can be yielded when the material is suitable to prevent the fire and/or hot gases from spreading.

The fire protection jacket preferably comprises a foaming binder, which includes an ash-forming and intumescent mixture of substances. Here, the binder serves a as a binding carrier for the ash-forming and intumescent mixture of substances. Preferably the mixture of substances is homogenously distributed in the binder. The binding carrier is preferably selected from the group comprising polyurethane, phenol resin, polystyrene, polyolefins, such as polyethylene and/or polybutylene, melamine resin, melamine resin foams, synthetic or natural rubber, cellulose, elastomers, and mixtures thereof, with polyurethane being preferred, here.

Beneficially, intumescent flame protection means are used as fire proofing additives which act to protect the substrate from overheating by forming an inflated insolating layer, developing under the influence of heat and comprising a flame retardant material.

In a preferred embodiment of the invention, the fire protective additives include at least one carbon network former, at least one propellant, at least one inorganic network former, and at least one acidifier. The components of the fire protective additive are particularly selected such that they can develop synergy effects, with some of the compounds perhaps fulfilling several functions.

In general, three components are required for the formation of an intumescent layer, a carbon source, a dehydration catalyst, and a propellant, which are contained in a binder, for example in case of lamination. Under the influence of heat the binder softens and the fire protective additives are released. By a thermal disintegration, the acid is released from the dehydration catalyst, withdrawing water from the carbon supplier and/or the binder, which leads to their coking (carbonization), and thus to the formation of a carbon structure, the so-called ash crust. Simultaneously, the propellant thermally disintegrates with the formation of inflammable gases, which leads to a foaming of the carbonized (coked) material, forming an isolating foam. Due to the fact that in case of fire the ash crust formed by the binder is generally insufficiently stable, and depending on its density and structure may be blown off, for example by air flow, which has negative effects upon the isolating effect of the coating, preferably a compound is added to the above-mentioned components, which can stabilize the ash crust formed by the binder or itself forms a structure, which maintains or reinforces the isolating effect of the coating.

Compounds commonly used as dehydration catalysts and/or acid formers are considered as intumescent flame proofing means, such as a salt or an ester of an inorganic, non-volatile acid, selected from sulfuric acid, phosphoric acid, or boric acid. Essentially, phosphor-comprising compounds are used, with here a wide range of options being given, because they extend over several oxidation levels of the phosphorus, such as phosphine, phosphine-oxide, phosphonium compounds, phosphates, elementary red phosphorus, phosphites, and phosphates. Mentioned as examples for phosphoric acid compounds are: mono-ammonium phosphate, di-ammonium phosphate, ammonium phosphate, ammonium polyphosphate, melamine phosphate, melamine resin phosphate, potassium phosphate, polyol phosphate, such as penta-erythritol phosphate, glycerin phosphate, sorbitol phosphate, mannitol phosphate, dulcitol phosphate, neo-pentyl glycol phosphate, ethylene glycol phosphate, di-penta erythritol phosphate, and the like. Preferably, polyphosphate or ammonium polyphosphate is used as the phosphoric acid compound. Here, melamine resin phosphates shall be understood as compounds, such as the conversion products from lamelite C (melamine formaldehyde resin) with phosphoric acid. Mentioned as examples for sulfuric acid compounds are: ammonium sulfate, ammonium sulfamate, nitro-aniline bi-sulfate, 4-nitro-aniline-2-sulfonic acid, and 4.4-di-nitro-sulfanilamide, and the like. An example mentioned for boric acid compounds is melamine borate.

Potential carbon suppliers for the intumescent flame proofing means are known compounds, such as compounds similar to starch, e.g., starch and modified starch, and/or polyvalent alcohols (polyols), such as saccharides and polysaccharides, and/or a thermoplastic or thermosetting polymeric resin binder, such as phenol resin, a urea resin, a polyurethane, polyvinylchloride, poly(meth)acrylate, polyvinyl acetate, polyvinyl alcohol, a silicon resin, and/or a rubber. Suitable polyols include polyols from the group sugar, penta erythrites, di-penta erythrites, polyvinyl acetate, polyvinyl alcohol, sorbitol, EO-PO-polyols. Penta erythrite, di-penta erythrite, or polyvinyl acetate is used preferably.

It shall be mentioned that in the event of fire the binder itself may also show the function of a carbon supplier.

Potential propellants are compounds commonly used in flame proofing means, such as cyanuric acid or iso-cyanuric acid and their derivatives, melamine and its derivatives. They include cyanamide, di-cyanamide, di-candiamide, guanidine and its salts, bi-guanide, melamin cyanurate, cyanic acid salts, cyanic acid esters and amides, hexa-methoxy methyl melamine, di-melamine pyrophosphates, melamine polyphosphate, melamine phosphate. Hexa-methoxy methyl melamine or melamine (cyanuric acid amide) is used preferably.

Suitable are further components with the effects not being limited to a single function, such as melamine polyphosphate, which acts both as an acidifier as well as a propellant. Additional examples are described in GB 2 007 689 A1, EP 139 401 A1, and U.S. Pat. No. 3,969,291 A1.

The compounds commonly used in flame proofing means are considered here as ash crust stabilizers and/or network formers, too, for example exfoliated graphite and granular metals, such as aluminum, magnesium, iron, and zinc. The granular metal may show the form of a powder, platelets, scales, fibers, strings, and/or whiskers, with the granular metal in the form of powder, platelets, or scales showing a particle size of ≤50 μm, preferably ranging from 0.5 to 10 μm. When using the granular metals in the form of fibers, strings, and/or whiskers, a thickness of 0.5 to 10 μm is preferred and a length of 10 to 50 µm. Alternatively or additionally, an oxide or a compound of a group comprising the metals aluminum, magnesium, iron, or zinc may be used as the ash crust stabilizer, particularly iron oxide, preferably iron trioxide, titanium dioxide, a borate, such as zinc borate and/or a glass frit comprising low-melting glass with a melting temperature at or above 400° C. The addition of such an ash crust stabilizer contributes to considerable stabilization of the intumescence crust in case of a fire, because these additives increase the mechanic stability of the intumescent layer and/or prevent it from dripping off. Examples of such additives are also found in U.S. Pat. Nos. 4,442,157 A, 3,562,197 A, GB 755 551 A, and EP 138 546 A1.

Additionally, ash crust stabilizers may be included, such as melamine phosphate or melamine borate.

The composition may include, in addition to fire proofing additives, perhaps common adjuvants, such as surfactants, for example based on poly-acrylates and/or poly-phosphates, defoamers, such as silicon foamers, thickening agents, such as alginate thickeners, colorants, fungicides, plasticizers, such as chlorinated wax, binders, flame retardant substances or various fillers, such as vermiculite, inorganic fibers, quartz sand, microscopic glass spheres, glimmer, silicon dioxide, mineral wool, and the like.

The network-forming carrier may also (comprise) as an ablative additive an inorganic compound, with water being permanently embedded therein, e.g., in the form of chemically combined water, which abstains from drying at temperature up to 100° C., however releases it in case of fire starting at 120° C. and thus can cool parts subject to such temperatures, preferably an inorganic hydroxide or hydrate, which can preferably release water in case of fire and/or flames, particularly aluminum hydroxide, aluminum oxide hydrate, or partially hydrogenated aluminum hydroxide. However, other inorganic hydroxides or hydrates are possible here, releasing water under the impact of flames, such as described in EP 0 274 068 A2.

Such compounds, which may be used as mixtures of substances in the fire protection jacket according to the invention, are disclosed for example in the following publications, which are hereby explicitly included by way of reference: DE 30 25 309 A1, DE 30 41 731 A1, DE 33 02 416 A1, DE 34 11 327 A1, EP 0 043 952 B1, EP 0 051 106 B1, EP 0 061 024 B1, EP 0 116 846 B1, EP 0 0158 165 B1, EP 0 274 068 A2, EP 1 347 549 A1, EP 1 641 895 B1, and DE 196 53 503 A1.

A "carbon supplier" is an organic compound, which by water splitting off is disintegrated into carbon and carbon dioxide (carbonation); these compounds are also called "carbon network formers".

An "acidifier" is a compound, which disintegrates under the effects of heat, i.e. above approximately 150° C. and releases a non-volatile acid and thus acts as a catalyst for the carbonation; additionally, it contributes to the reduction of viscosity of the melted binder; accordingly the term "dehydration catalyst" is used synonymously, here.

A "propellant" is a compound, which disintegrates at elevated temperatures under the development of inert, i.e. non-flammable gases and inflates the melted binder into foam (intumescence); this term is used synonymously with "gas former".

An "ash crust stabilizer" is a so-called network forming compound, which stabilizes the carbon network formed by the cooperation of the carbon formation from the carbon source and the gas of the propellant. The principle functionality is here such that the carbon layers developing, rather soft per se, are mechanically reinforced by inorganic compounds. The addition of such an ash crust stabilizer contributes to a considerable stabilization of the intumescence crust in case of fire, because these additives increase the mechanic stability of the intumescent layer and/or prevent it being from dripping off. An example for this aspect is the formation of titanate phosphates from the two component titanium dioxide and ammonium polyphosphate.

In general, exfoliated graphite is used for the physical intumescence. It may be bonded, similar to the above-mentioned additives (or in addition thereto) in the carrier material.

In this context, reference is made to the document EP 1489136 A1.

The exfoliated graphite is considered for example for incorporated compounds of SOx, NOx, halogen, and/or strong acids in graphite, known from prior art. They are also called graphite salts. Exfoliated graphite is preferred, which releases for example $SO_2$, $SO_3$, NO, and/or NO2 under expansion at temperatures ranging from 120 to 350° C. The exfoliated graphite may be present for example in the form of platelets with a maximum diameter ranging from 0.1 to 5 mm. Preferably, this diameter ranges from 0.5 to 3 mm. For the present invention, suitable exfoliated graphite is commercially available. In general, the exfoliated graphite particles are evenly distributed in the fire protective jackets according to the invention. The concentration of the exfoliated graphite particles may also be punctual, pattern-like, planar, and/or like a sandwich, though.

The predetermined temperature is preferably above the operating temperature of the battery cell in the battery unit, which shows the highest operating temperature. Beneficially the predetermined temperature is below the temperature at which one of the battery cells inside the battery unit could be damaged.

Beneficially, the fire protection jacket is designed at the predetermined temperature such that it reduces the dissipation of heat energy, preferably prevents it. Preferably the fire protection jacket is embodied such that it can be well adjusted to the form of the battery cell such that the fire protection jacket can be arranged in a space-saving fashion. Beneficially the fire protection jacket is arranged in the battery pack such that it abstains from interfering with the regular operation and becomes active and/or operates preactively only in case of a malfunction.

Preferably, the isolation battery cell is thermally isolated from other battery cells at a predetermined temperature. This way, the transfer of thermal energy from the isolation battery cell to the other battery cells can be reduced or prevented entirely. When excessive temperature develops in one battery cell, any heating of the other battery cells and thus the so-called "thermal runaway" can be prevented. In case of thermal overload, any spreading to neighboring battery cells, their proximity, the housing, people, and the environment can be prevented by using a flame retardant and/or fire extinguishing material.

In one preferred embodiment, the fire protection jacket is implemented such that it reduces the oxygen supply to the isolation battery cell at the predetermined temperature. This way, any fire developing can be extinguished. It is particularly preferred for the fire protection jacket to be implemented such that at a predetermined temperature the oxygen supply to the isolation battery cell is prevented for a predetermined period.

It is advantageous for the fire protection jacket to be embodied such that it is fluid-tight at the predetermined temperature. This way it can be achieved that less fluid seeps out of the isolation battery cell and reaches the environment. Preferably, a fire protection jacket is used, which is suitable to completely prevent any liquids from penetrating. The fire protection jacket is beneficially tightly sealed towards electrolytes.

In one embodiment, the fire protection jacket comprises a polymer. Particularly suitable, network forming carriers are found among polymers, accordingly they are suitable materials for the fire protection jacket.

A polymer is a chemical compound comprising chains or branched molecules, which in turn are made from identical or similar units, the monomers.

In one preferred embodiment, the fire prevention jacket shows a network structure. A network structure may be embodied in a simple fashion such that during a flawless operation ambient air can penetrate, in order to cool individual parts, for example. Sufficient material may be provided in a network structure in order to allow achieving a thermal isolation and/or an extinguishing effect at a predetermined temperature, for example by reducing the penetration of oxygen.

In one embodiment, the fire protection jacket shows a fire protection belt, a fire protection mat, fire protection foam, or a foam mat. The fire protection jacket can this way be provided in a particularly simple fashion.

A fire protection belt is a commercially available belt which is commonly used for insulating flammable pipes in penetrations through walls and ceilings. Fire proofing foam is, for example, known to insulate cables, bundles of cables, cable trays, and pipes, and is also commercially available. A fire proofing mat is known for example for fire protection in the area of hollow walls sockets. Fire proofing mats are also commercially available.

A foam mat is a mat, which shows a low density and a cellular structure. Material used for the foam mat may be, for example, polyurethane, polystyrene, polyethylene, elastomer, and mixtures thereof, with polyurethane being preferred, here.

It is particularly preferred when all battery cells are embodied as isolation battery cells. This allows a high level of protection from fire damage at individual battery cells of the battery unit and its proximity.

In one embodiment, at least two isolation battery cells are embodied as flat cells, the fire protection jacket comprises a fire proofing mat or a fire proofing belt, and the fire proofing mat or the fire proofing belt is arranged between the two isolation battery cells, which are embodied as flat cells. The coating of the isolation battery cell is this way achieved in a simple fashion.

Preferably, a flat cell is a battery cell, with its depth being lower than its width and height. In a preferred embodiment a flat cell comprises at least one flat surface.

At least a portion of the fire proofing mat or the fire proofing belt is located between the two isolation battery cells embodied as flat cells. In one embodiment, a fire protection jacket is arranged completely between the isolation battery cells embodied as flat cells. In this case, preferably an additional fire protection jacket is provided in the battery, which is designed at a predetermined temperature to cover another section of the isolation battery cell.

In one embodiment, at least one isolation battery cell is embodied as a round cell, the fire protection jacket comprises a fire proofing mat or a fire proofing belt, and the fire proofing mat or the fire proofing belt is arranged surrounding the isolation battery cell embodied as a round cell. This way, a coating of the isolation battery cell can be easily accomplished as well.

A round cell is preferably a battery cell, which shows a round cross-section. In a preferred embodiment a round cell shows a cylindrical form.

The safety can be increased in a particularly strong fashion when the fire protection jacket at least partially surrounds all battery cells jointly such that the battery cells in the battery unit are surrounded by the fire protection jacket at the predetermined temperature such that the battery cells are thermally isolated from the environment.

Beneficially, the battery shows a housing and the fire protection jacket is at least partially integrated in said housing. The fire protection jacket can this way be provided in a particularly space-saving fashion.

Particular advantages can be yielded when the battery unit shows a housing and the fire protection jacket at least partially surrounds any material at least partially arranged inside the housing such that the material is surrounded by the fire protection jacket at the predetermined temperature such that the material is thermally insulated. The material can this way be protected from high temperatures in a particularly good fashion.

Further, a machine tool is suggested comprising a battery unit as described above.

Furthermore, a method is provided for producing a battery unit for a machine tool. Here, several battery cells are provided, with at least one of the battery cells being provided as an isolation battery cell. Additionally, a fire protection jacket is provided comprising an intumescent material. The isolation battery cells are at least partially surrounded by the fire protection jacket such that the isolation battery cell is surrounded by the fire protection jacket at a predetermined temperature such that the battery cell is thermally insulated.

EMBODIMENTS OF THE INVENTION

FIG. 1 shows schematically an electric screwdriver 200 as an example for a battery-operated and handheld machine tool. The electric screwdriver 200 shows a tool accept 201, which is driven by an electric engine 1. The user can insert a suitable tool 203, e.g., a screwdriver bit or a drill bit, into the tool accept 201. The user can hold and guide the electric screwdriver 200 during operation using a handle 204. A switch 205 at the handle 204 controls the start of operation of the electric screwdriver 200. A battery unit 207 (battery pack) is detachably fastened at the housing 208 of the electric screwdriver 200, for example near the handle 204. The battery provides the electric engine 202 and other consumers of the electric screwdriver 200 with power. Other battery-operated and handheld machine tools are for example power drills, hammer drills, handheld buzz saws, jig saws, mobile blowers, lawn trimmers, grinders, etc.

Figure 2:
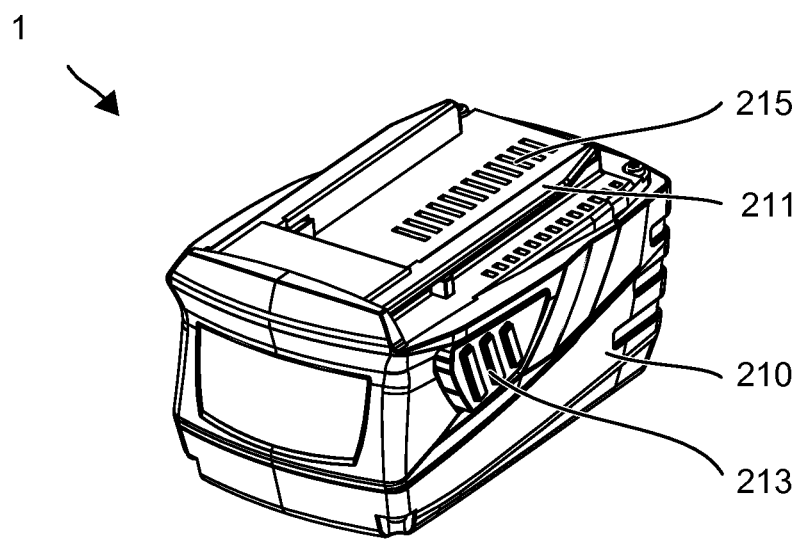

FIG. 2 shows an exemplary battery unit 1 for a machine tool 200. The battery unit 1 shows a housing 210, which can be fastened via a suspension 211 at the handheld machine tool. The suspension 211 may for example be locked and unlocked by a push button 213. The battery unit 1 shows several battery cells 2 inside the housing 210. Ventilation slots 216 in the housing 210 allow cooling the battery cells 2.

Figure 3:
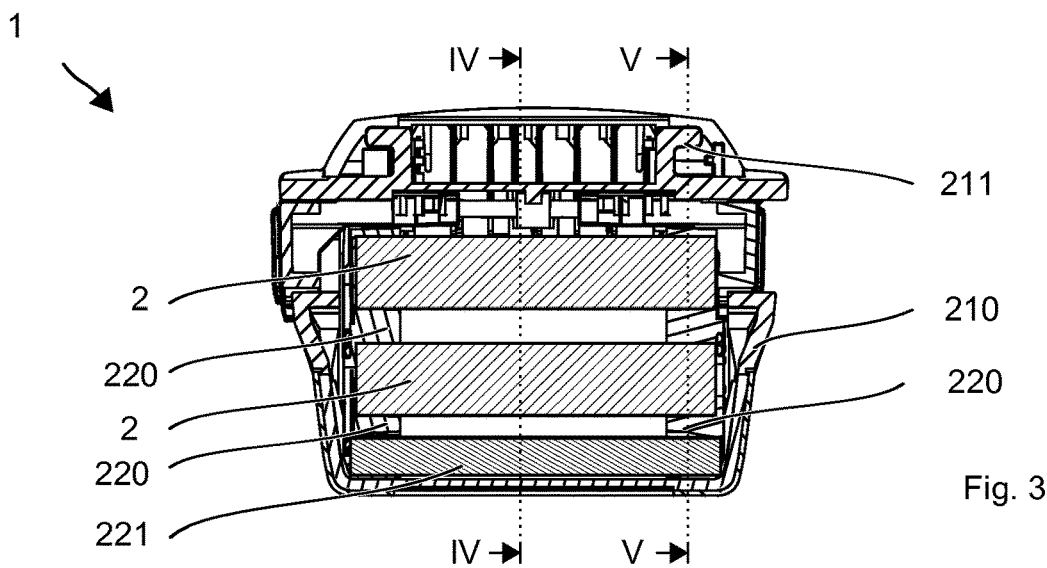
Figure 4:
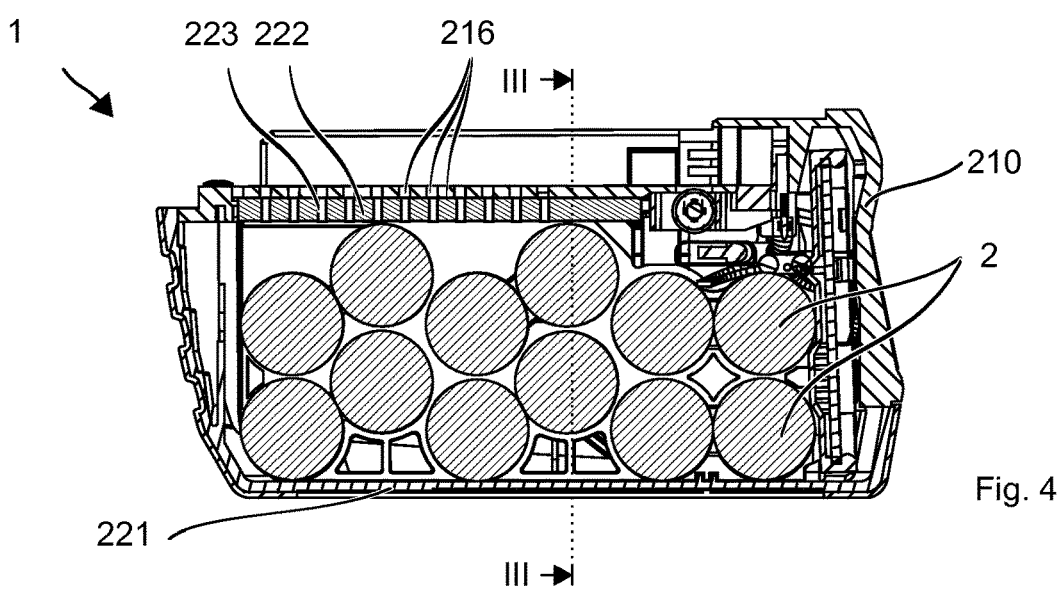
Figure 5:
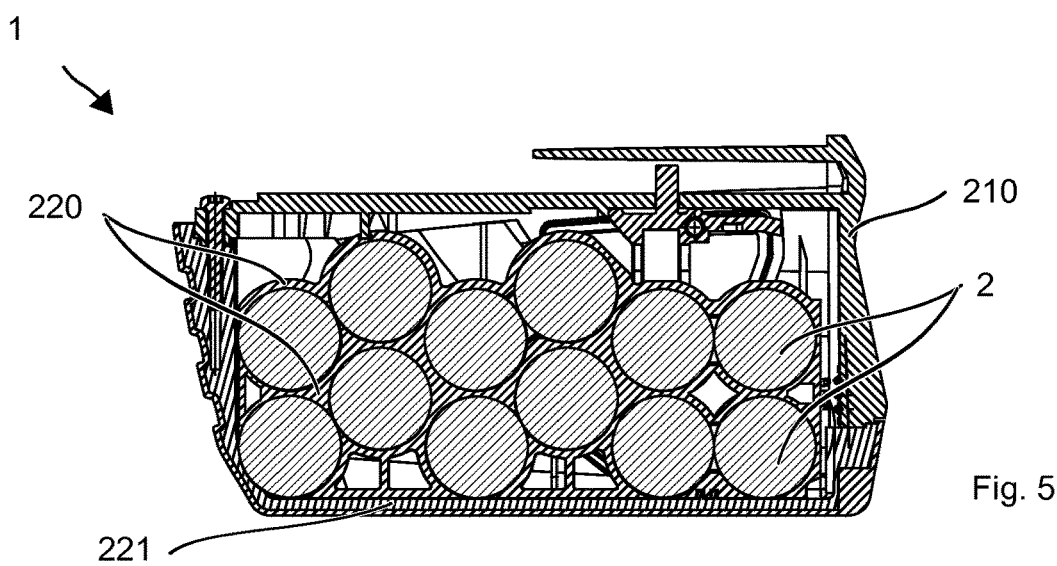

FIG. 3 shows a longitudinal cross-section in the level III-III through the battery unit, FIG. 4 shows a cross-section in the level IV-IV, and FIG. 5 shows a cross-section in the level V-V. The battery cells 2 are suspended at their ends in two fasteners 220.

The housing 210 is coated at its inside with a jacket comprising an intumescent material. The intumescent material expands under the influence of heat coming from a strongly heating battery cell 2, particularly a burning one. The material can simultaneously act in a cooling fashion by emitting water or by consuming thermal energy using chemical-physical conversion of a fire proofing additive. The described intumescent materials act in an isolating fashion and delay the development of heat at the exterior of the battery unit 1. Additionally, poisonous gases are prevented from being emitted.

The exemplary jacket is composed from several parts. For example, a mat 221 comprising an intumescent material is inserted at the bottom of the housing. Another mat 222 may cover a top side. The ventilation openings 216 are provided at the top in the exemplary battery unit 1. The top mat 222 is also provided with respective openings 223. When the intumescent material expands the openings 223 are closed. Additional mats seal the other sides of the housing 210.

The battery cells 2 are preferably surrounded individually or at least partially individually. It is particularly preferred that the fasteners 220 are made from the intumescent material. The material directly contacts the battery cells 2.

In the following, the principle and other embodiments are explained based on the schematic figures.

Figure 6:
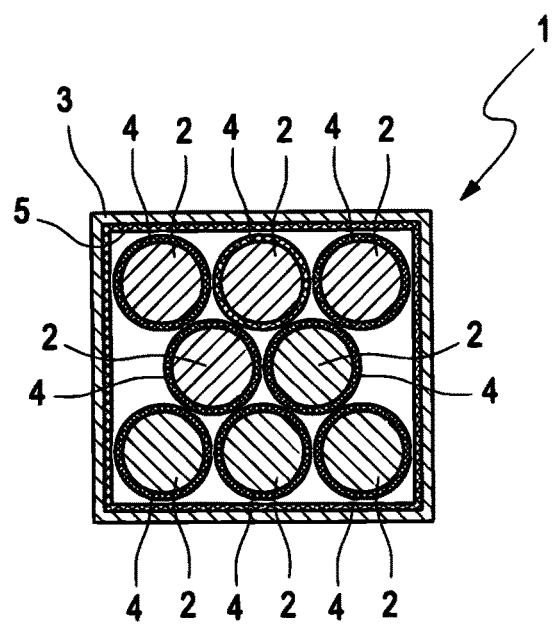

FIG. 6 shows a cross-section through a schematic battery unit 1 with eight round battery cells 2 in normal operation. The eight round battery cells 2 are arranged in a housing 3. A fire proofing belt 4 is wound about each of the round battery cells 2. Alternatively, several fire proofing belts 4 may be wound about the round battery cells 2.

Several fire proofing mats 5 are provided at the interior wall of the housing 3.

The fire proofing belts 4 and the fire proofing mat 5 comprise polyurethane. They foam under the development of heat, for example in case of a fire. Such a quantity of fire proofing belts 4 shall be wound about a round battery cell 2 that in the foamed state at least one continuous layer develops surrounding the round battery cell 2. Similarly, the fire protection mat 5 shall be arranged such that in the foamed state at least one continuous layer develops at the interior wall of the housing 3.

Figure 7:
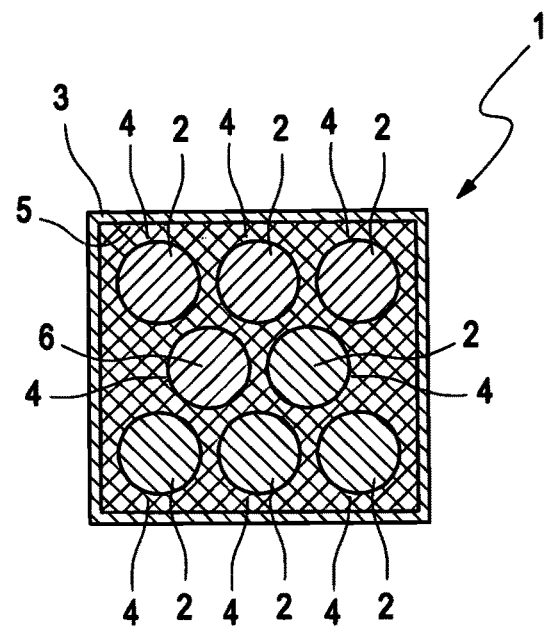

FIG. 7 shows a cross-section through a battery unit 1 with eight round battery cells 2 during malfunction. The fire protection belts 4 and the fire protection mat 5 introduced are foamed and form not only continuous layers but also completely fill the hollow cavities in the housing 3.

The foaming has been triggered by the operating temperature being exceeded due to a fire in a faulty battery cell 6. By the foam the oxygen supply to this faulty battery cell 6 has been interrupted. This way, initially the spreading of the fire has been prevented and later the fire has been completely extinguished. Damages to the environment of the battery unit 1 are completely prevented. Even the other seven round battery cells 2 are still intact.

Figure 8:
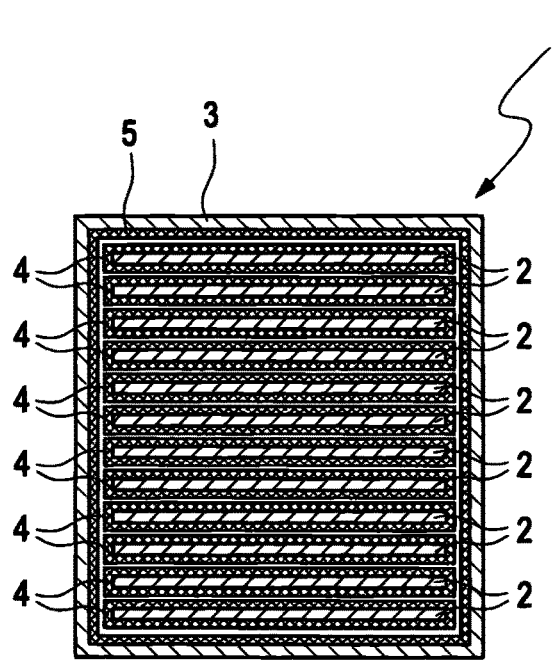

FIG. 8 shows a cross-section through a battery unit 1 with twelve flat battery cells 2 in normal operation. The twelve flat battery cells 2 are arranged in a housing 3. A fire proofing belt 4 is wound about each of the twelve flat battery cells. Alternatively, several fire proofing belts 4 may be wound about one flat battery cell 2. Here, a fire proofing belt 4 or a fire proofing mat 5 may also be inserted between respectively two of the flat battery cells 2. A fire proofing mat 5 is provided at the interior wall of the housing 3.

As described regarding FIG. 5, such a quantity of fire proofing belt 4 and/or fire proofing mat 5 shall be arranged about a flat battery cell 2 that in the foamed state at least one continuous layer forms around the flat battery cell 2. Accordingly, the fire proofing mat 5 shall be arranged such that in the foamed state it forms at least one continuous layer at the interior wall of the housing 3.

Figure 9:
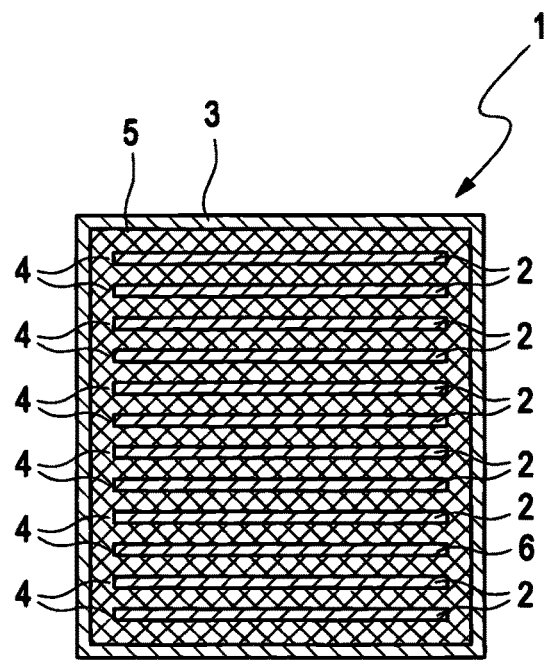

FIG. 9 shows a cross-section through a battery unit 1 with twelve flat battery cells 2 during malfunction. Here, too the inserted fire proofing belts 4 and the fire proofing mat 5 are foamed and completely fill the cavities in the housing 3. Once more, a faulty battery cell 6 is given. Similar to FIG. 6, the spreading of a fire could be prevented from the faulty battery cell 6 to the other battery cells 2.

The invention claimed is:

1. A battery unit for a handheld machine tool comprising:
   a housing;
   a plurality of battery cells, with at least one of the battery cells being an isolation battery cell;
   one or more fasteners securing at least one of the battery cells within the housing; and
   a fire protection jacket having a network structure;
   wherein the fire protection jacket and one or more fasteners comprise a binder and an intumescent material homogenously distributed in said binder;
   wherein said fire protection jacket at least partially surrounds the isolation battery cell and at least partially coats the inside of the housing;
   wherein the fire protection jacket expands at a predetermined temperature above the operating temperature of the isolation battery cell such that the isolation battery cell is thermally insulated and the housing is sealed;
   wherein said intumescent material comprises a carbon network former, a dehydration catalyst and a propellant.

2. A battery unit of claim 1 wherein the fire protection jacket is embodied to reduce the oxygen supply to the isolation battery cell at a predetermined temperature.

3. A battery unit of claim 1 wherein the fire protection jacket is embodied to be liquid-tight at a predetermined temperature.

4. A battery unit of claim 1 wherein the fire protection jacket comprises a polymer.

5. A battery unit of claim 1 wherein the fire protection jacket comprises a fire proofing belt, a fire proofing mat, fire proofing foam, or a foam mat.

6. A battery unit of claim 1 wherein all battery cells are embodied as isolation battery cells.

7. A battery unit of claim 1 wherein the fire protection jacket at least partially surrounds all battery cells jointly such that the battery cells in the battery unit at the predetermined temperature are surrounded by the fire protection jacket such that the battery cells are thermally insulated from the environment.

8. A battery unit of claim 7 wherein the battery unit comprises a housing and the fire protection jacket is integrated at least partially in said housing.

9. A battery unit of claim 1 wherein the battery cells are suspended in a fastener and the fastener is made from a fire proofing material.

10. A battery of claim 1 wherein the battery unit comprises a housing and the fire protection jacket surrounds at least partially any material arranged inside the housing such that the material is surrounded by the fire protection jacket at the predetermined temperature such that the material is thermally insulated.

11. A handheld machine tool with an accumulator according to claim 1.

12. A battery unit of claim 1 wherein the binder comprises polyurethane.

13. A battery unit of claim 1 wherein the carbon network former comprises penta erythrite, di-penta erythrite, polyvinyl acetate or mixtures thereof.

14. A battery unit of claim 1 wherein the dehydration catalyst comprises poly-phosphate, ammonium polyphosphate or mixtures thereof.

15. A battery unit of claim 1 wherein the propellant comprises hexa-methoxy methyl melamine, melamine or mixtures thereof.

16. A battery unit of claim 1 wherein said network structure has voids and/or is sufficiently porous that ambient air can penetrate said network structure below the predetermined temperature.

17. A battery unit of claim 1 wherein said fire protection jacket has a mesh structure.

18. A method for the production of a battery unit for a handheld machine tool comprising:
   providing a housing;
   providing a number of battery cells, with at least one of the battery cells being an isolation battery cell;
   securing at least one battery cell within the housing using at least one fastener;
   providing a fire protection jacket having a network structure; and
   at least partially surrounding the isolation battery cells and at least partially coating the housing with the fire protection jacket
wherein the fire protection jacket and one or more fasteners comprise a binder and an intumescent material homogenously distributed in said binder;
wherein the isolation battery cell expands at a predetermined temperature above the operating temperature of the isolation battery cell such that the isolation battery cell is thermally insulated and the housing is sealed;
wherein said intumescent material comprises a carbon network former, a dehydration catalyst and a propellant.

* * * * *